United States Patent [19]

Gray

[11] Patent Number: 4,479,205

[45] Date of Patent: Oct. 23, 1984

[54] METHOD OF MIGRATING SEISMIC DATA WITHOUT DEPENDENCY ON VELOCITY

[75] Inventor: William C. Gray, Houston, Tex.

[73] Assignee: Mobil Oil Corporation, New York, N.Y.

[21] Appl. No.: 321,962

[22] Filed: Nov. 16, 1981

[51] Int. Cl.³ .............................................. G01V 1/32
[52] U.S. Cl. ........................................ 367/63; 367/49; 367/74; 367/36
[58] Field of Search ..................... 367/51-55, 367/59, 63, 73, 74, 36, 49, 50, 68

[56] References Cited

U.S. PATENT DOCUMENTS 3,696,331  10/1972  Guinzy et al. ................. 367/53
4,259,733   3/1981  Taner et al. ................... 367/61

OTHER PUBLICATIONS

French, "Two-Dimensional and Three-Dimensional Migration of Model-Experiment Reflection Profiles", Geophysics, vol. 39, No. 3 (Jun. 1974), pp. 265-277.

Yilmaz et al., "Prestack Partial Migration", Geophysics, vol. 45, No. 12, (Dec. 1980), pp. 1753-1779.

Hatton et al., "Migration of Seismic Data from Inhomogeneous Media", Geophysics, vol. 46, No. 5, (May 1981), pp. 751-767.

Taner et al., "Velocity-Spectra-Digital Computer Derivation and Applications of Velocity Functions", Geophysics, vol. 34, No. 6, (Dec. 1969), pp. 859-881.

Primary Examiner—Maynard R. Wilbur
Assistant Examiner—K. R. Kaiser
Attorney, Agent, or Firm—Alexander J. McKillop; Michael G. Gilman; Charles J. Speciale

[57] ABSTRACT

A method for migration of velocity spectra is disclosed wherein migration of common depth point gathers is accomplished without prior determination of the velocity/depth field.

5 Claims, 8 Drawing Figures

METHOD OF MIGRATING SEISMIC DATA WITHOUT DEPENDENCY ON VELOCITY

BACKGROUND OF THE INVENTION

The present invention pertains to a method for improving the quality of seismic data and more particlarly to the migration of seismic common depth point gathers.

Seismic data is gathered by generating acoustic pulses into the earth's surface ("shooting") and detecting the reflected or refracted waves with acoustic pulse detectors such as geophones. When acoustic pulses come in contact with an interface, such as an oil/gas, oil/water or shaley sand/salt dome, a portion of the acoustic wave will be reflected back to the surface. Several "shot" points are commonly used in a row in conjunction with a line of detectors or geophones. The line of shot points together with the line of geophones essentially define a slice or plane of the earth perpendicular to the earth's surface.

In theory, the detected acoustic pulses yield a map of this plane indicating interfaces between substances having different acoustical properties. Unfortunately, this theory is applicable only as long as the interfaces are parallel to the surface of the earth. Interfaces are not always parallel to the earth's surface and a change in acoustical properties may be misplaced on the map of the subsurface plane. For this reason, a process of migration is routinely performed.

Migration is a process which maps seismic wavefields which are recorded in the time domain into a depth domain through a wave equation and a suitable velocity field. Normally, the data is processed before migration. A velocity is determined and the data gathered by the acoustic pulse detectors is stacked; data gathered at a common depth point from several detectors is combined by methods known in the art. The velocity field is normally determined from the velocity used to stack the seismic data. This determination is based on the fact that migration methods presently in use are insensitive to reasonable velocity errors. Newer migration methods allow lateral velocity variation but are extremely sensitive to velocity errors and are used infrequently and cautiously.

Additional methods of migration have been developed which migrate the detected data before stacking. While prestack migration is more desirable than poststack migration, since stacking tends to destroy diffractions, buried foci and other wave phenomena present in unstacked data, no method of prestack migration had previously been developed which is economically feasible for routine seismic processing.

Present methods for migration all have a common deficiency, a velocity field must be picked from the seismic data or nearby well logs and used as an input to the migration process.

SUMMARY OF THE INVENTION

The present invention overcomes the deficiency of prior art migration methods and removes the requirement for picking a velocity field. Velocity spectra are computed for common depth point gathers. A three dimensional matrix whose dimensions are common depth point, zero offset time and stacking velocity is obtained. Migration is performed on a frequency domain representation of x-$t_o$ slices for each velocity. This representation is inverse transformed to yield a series of constant velocity depth sections. These depth spectra sections are summed over velocity to obtain a model of the subsurface structure.

DESCRIPTION OF THE PREFERRED EMBODIMENT

Figure 1:
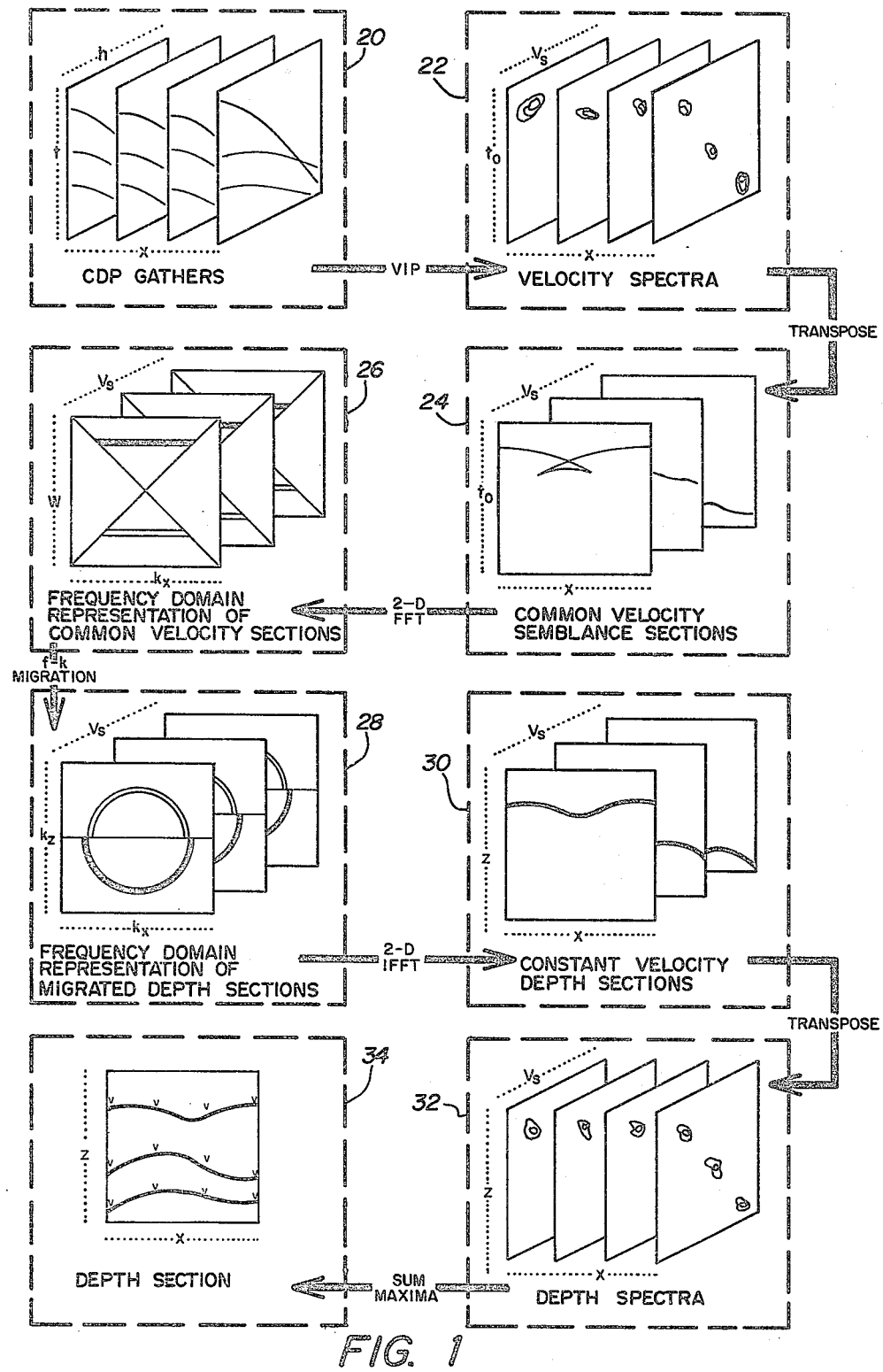
FIG. 1 is a flow graphical representation of velocity free migration.

Referring to FIG. 1, an illustrated flow chart of the present invention is depicted. Block 20 illustrates four graphs, each for an individual common depth point. The X axis indicates the common depth point. The t axis indicates the two way travel time and the h axis is the offset. Block 22 illustrates the same four graphs of block 20 depicting the velocity spectra of each after a velocity from integrated powers (VIP) process has been performed on the common depth point gathers. This process is described in detail in U.S. Pat. No. 3,396,331 entitled "Automatic Process for Determining Subsurface Velocities From Seismograms" by Norman J. Guinzy et al. The $t_o$ axis is zero offset time and $V_s$ is the "stacking velocity". Block 24 illustrates graphical representations of common velocity semblance sections of the common depth point gathers of block 20. The data of block 22 is "transposed" to obtain the data of block 24. A two dimensional fast Fourier transform is performed on the data of block 24 to yield frequency domain representations in block 26 of the common velocity sections. The frequency domain representations are migrated at constant velocities to yield frequency domain migrated depth sections illustrated in block 28. From the migrated depth sections of block 28, constant velocity depth sections illustrated in block 30 are obtained through a two dimensional inverse fast Fourier transform. The data of block 30 is transposed to yield depth spectra illustrated in block 32. The depth spectra maxima are summed over velocity to produce the depth section of block 34.

Common depth point seismic data gathers are collected by methods commonly known in the art. A set of common depth point gathers may be defined as a function $$U(x, t, h, z=0)$$

where, x = the common depth point location
t = the two way travel time
h = the offset and
z = the depth coordinate to provide the graphical representations depicted in block 20.

A velocity spectra, as illustrated in block 22, may be defined as a function $$S(x, t_o, V_s, z=0)$$

where,
$t_o$ = zero offset time and
$V_s$ = stacking velocity.

The velocity spectra are found through a process known as Velocity from Integrated Powers (VIP) wherein the common depth point (CDP) gathers are used to compute the semblance within time windows along hyperboli over the offset dimension h. Each of the hyperbolic trajectories is described by $t_o$ and $V_s$. The velocity spectra is defined by $$S(x, t_o, V_s, z=0) = \frac{\sum_\tau \left[ \sum_h U(x, t_h + \tau, h, z=0) \right]^2}{\sum_\tau \sum_h [U(x, t_h + \tau, h, z=0)]^2}$$

where, $t_h = \sqrt{t_o^2 + h^2/V_s^2}$ and $\tau$ ranges over the duration of the moving time window. By computing the velocity spectra for each consecutive CDP gather, a three dimensional matrix whose coordinates are CDP location, zero offset time and stacking velocity is obtained which loses significant amounts of amplitude information. This sacrifice is made to obtain the high signal and velocity resolution offered by the velocity spectra. The structural and velocity information is preserved to the extent that they were defined by nearly hyperbolic curves over offset. The velocity spectra also preserves diffractions, fault planes, buried foci and multiple reflections.

The velocity spectra is then transposed to obtain the common velocity semblance sections illustrated in block 24. The transposition essentially defines planes perpendicular to the velocity spectra planes and produces a graphical representation of a common velocity or a common velocity semblance section.

A two dimensional Fourier transform of the wavefield for a single stacking velocity may be expressed as a function $$\hat{S}(k_x, w, V_s, z=0)$$

where,
$k_x$ = wave number analog of X and
W = analog of $t_o$.

A constant velocity solution to the wave equation was shown in the prior art to be $$\hat{P}(k_x, t=0, V_s, k_z) =$$

$$\frac{V_s |k_z|}{2\sqrt{k_z^2 + k_x^2}} \hat{S}\left( k_x, V_s \frac{\sqrt{k_x^2 + k_z^2}}{2}, V_s, z=0 \right)$$

where, $K_z$ = the analog of z as illustrated in block 28.

This solution is a mapping of complex variables with its effect in the time domain being a convolution of the wavefield with upward hyperboli of different trajectories dependent on $t_o$ and $V_s$.

The frequency domain representation of block 26 is migrated by mapping w-$k_x$ slices for each velocity according to the wave equation solution above, to produce the results illustrated by the graphical representations of block 28.

The migrated frequency domain representation is inverse transformed to yield depth sections which may be defined as a function $$P(x, t=0, V_s, Z)$$

as illustrated by the graphical representation of block 30 for each velocity.

This process is repeated for each velocity and the result is placed on the original grid where the same ordinate is replaced by a depth ordinate.

The graphical representations of block 30 are transposed to yield the graphical representations of depth spectra depicted in block 32. This transposition essentially plots the velocity vs. depth for each common depth point location.

The depth section of block 34 is obtained by summing the depth spectra of block 32 over velocity to produce a two dimensional graphical representation of subsurface formations as a function of depth and common depth point location.

The example was obtained using synthetic data generated with a ray tracing program.

Figure 2:
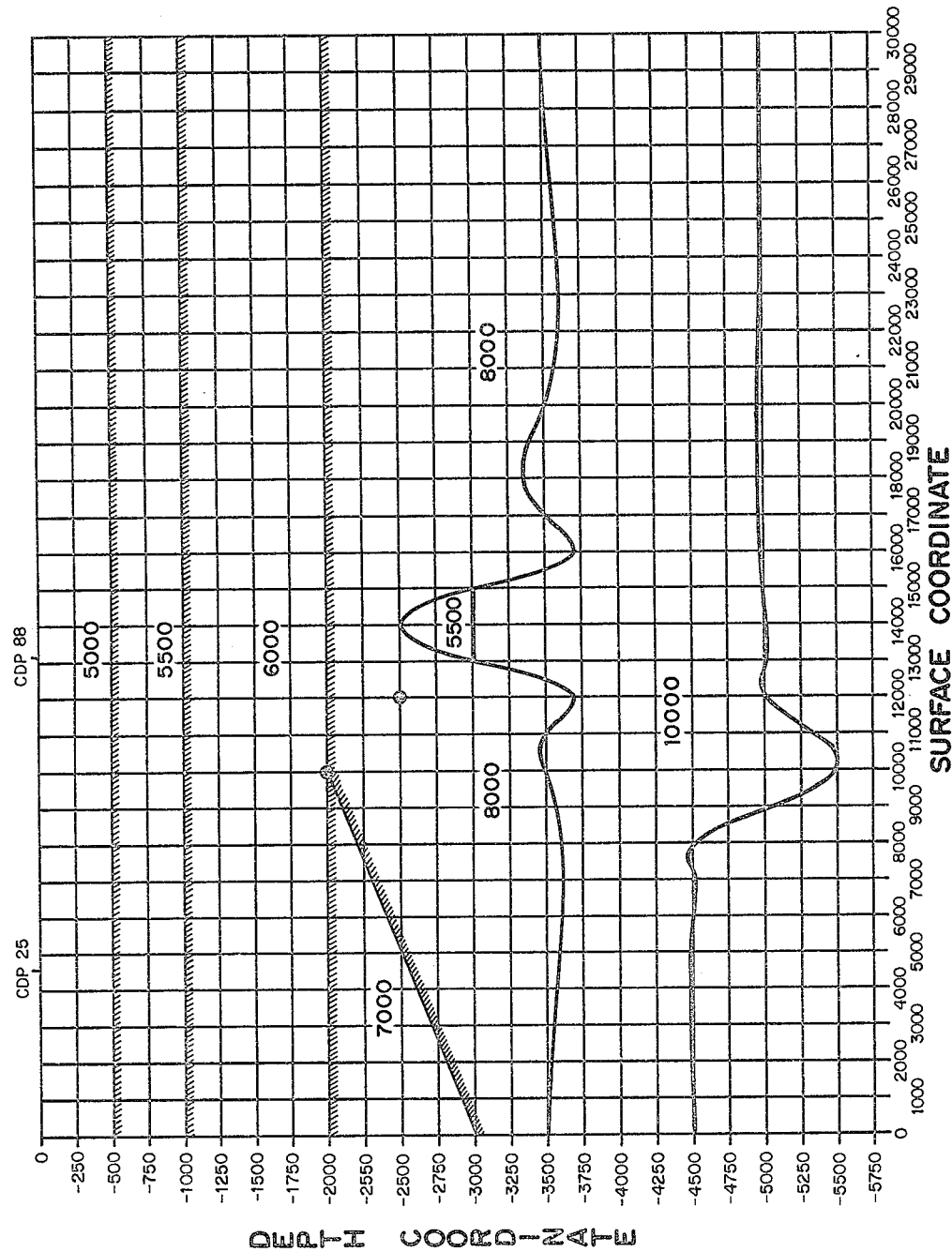
FIG. 2 is graphical representation of a seismic model.
Figure 3:
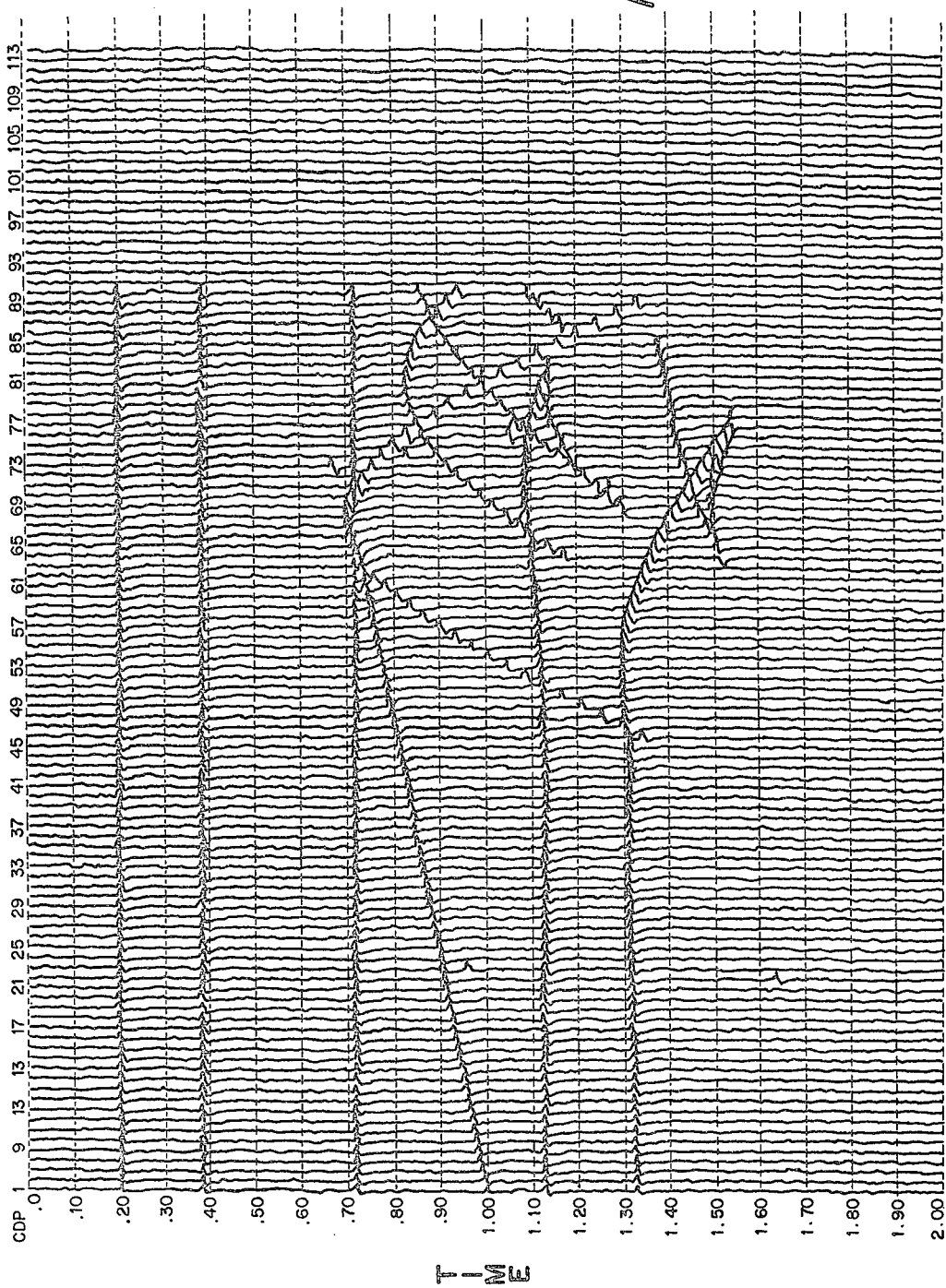
FIG. 3 is a graphical representation of zero offset traces of the model of FIG. 2.
Figure 4:
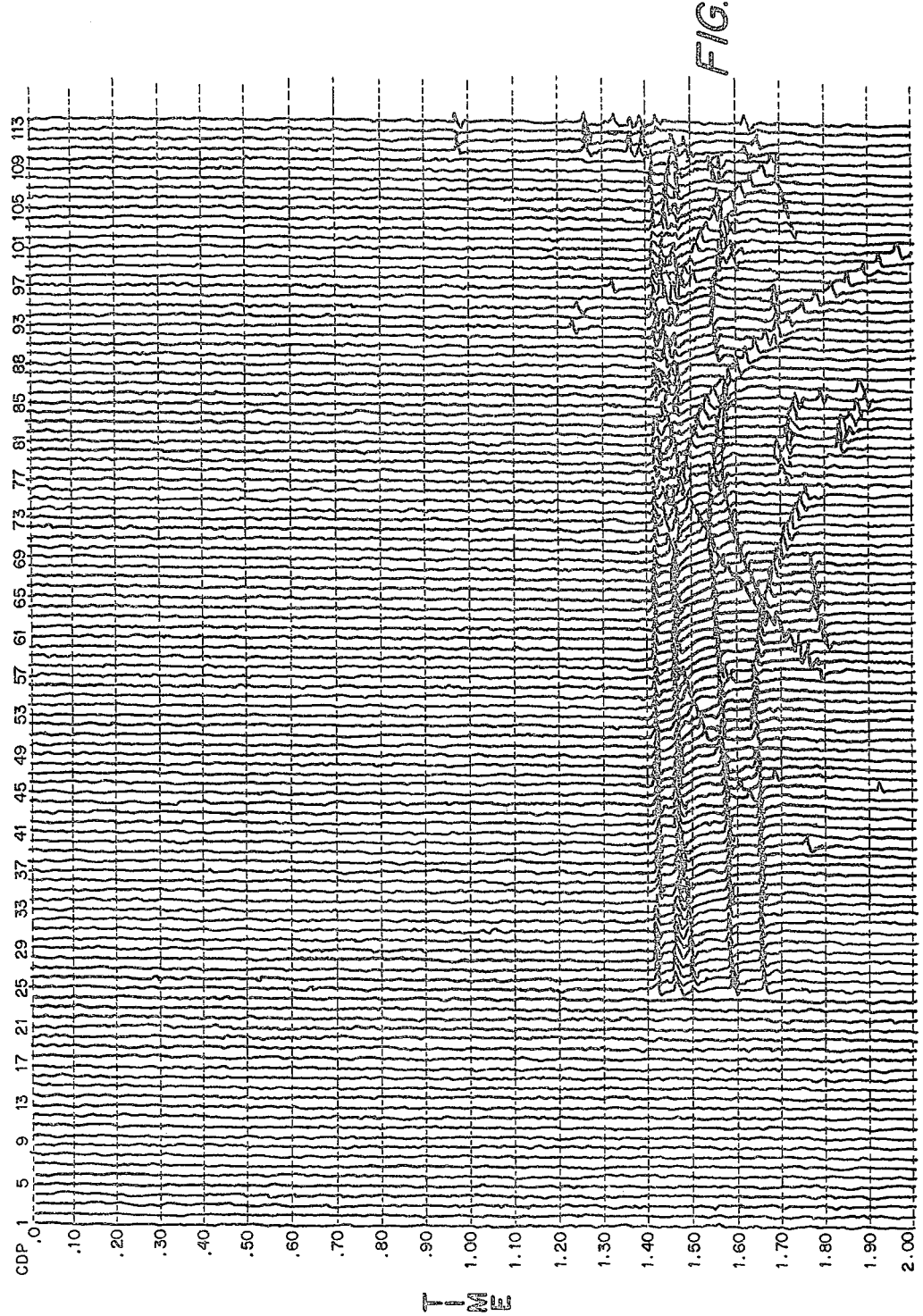
FIG. 4 is a graphical representation of far offset traces of the model of FIG. 2.

FIG. 2 is the model used for the ray tracing. Two diffractions were simulated as half circles with a fifty-foot radius at points (10,000-2,000) and (12,000-2,500). FIGS. 3 and 4 display the near and far offset sections of the synthetic CDP gathers. The time spikes from the model were convolved with a 10-50 Butterworth filter. Divergence and reflection coefficient estimates were ignored; all events were assigned an amplitude of 1. Uniform noise in the range (−0.2, 0.2) was added. The far offset section is fascinating because the diffractions, present as hyperboli on the zero offset section, have become "table tops."

Ninety shot gathers were computed, the first shot at the origin of the model of FIG. 2. The shot interval was 150 feet. Twenty-five receivers were shot into. The first receiver was located at the shot, successive receivers were spaced at 300 foot increments. The results were sampled at an interval of 4 milliseconds.

The synthetic field data were collected in 114 CDP gathers. The first full fold gather was CDP 25, the last, CDP 88. The far twenty-four traces of each gather were deconvolved with a two point prediction gap.

Figure 5:
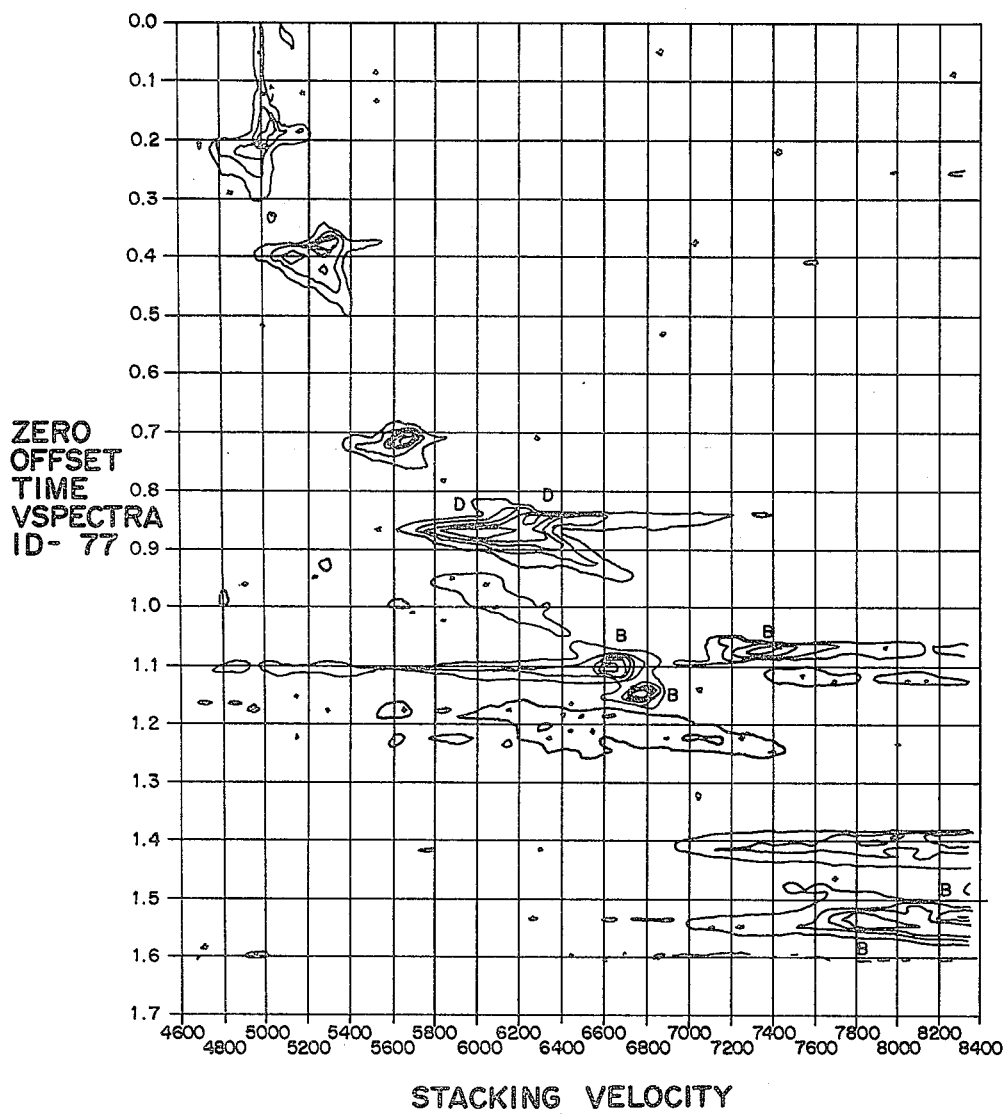
FIG. 5 is a graphical representation of a typical velocity spectra of one common depth point.

The deconvolved gathers were VIP'd using a 32 millisecond window moving in time every 16 milliseconds. The stacking velocity increment was 50 ft/sec ranging from 4,650 ft/sec to 8,300 ft/sec FIG. 5 is the velocity spectra at CDP 77. Diffractors are labeled by D's and the legs of the buried foci by B's on the velocity spectra.

Figure 6:
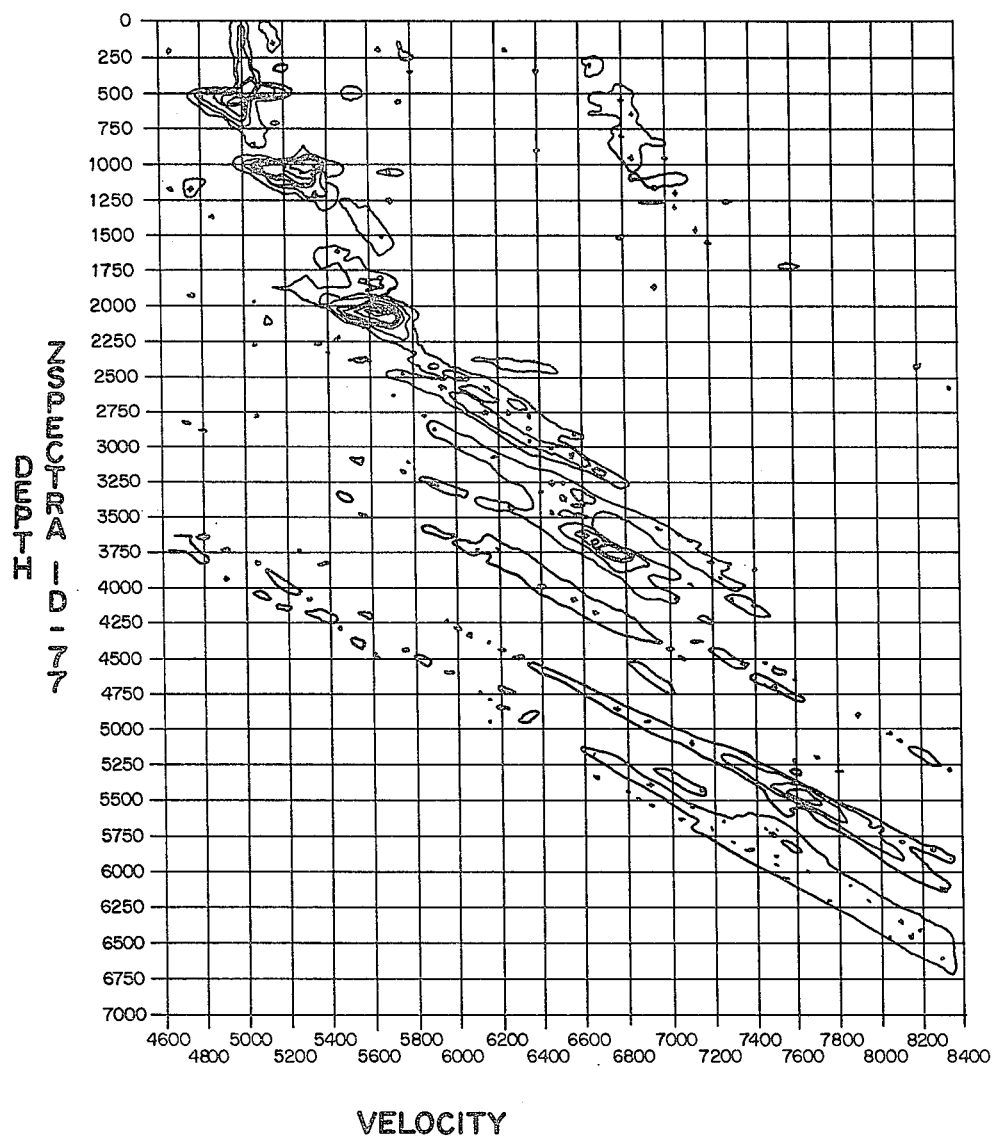
FIG. 6 is a graphical representation of a depth spectra of the velocity spectra of FIG. 5.
Figure 7:
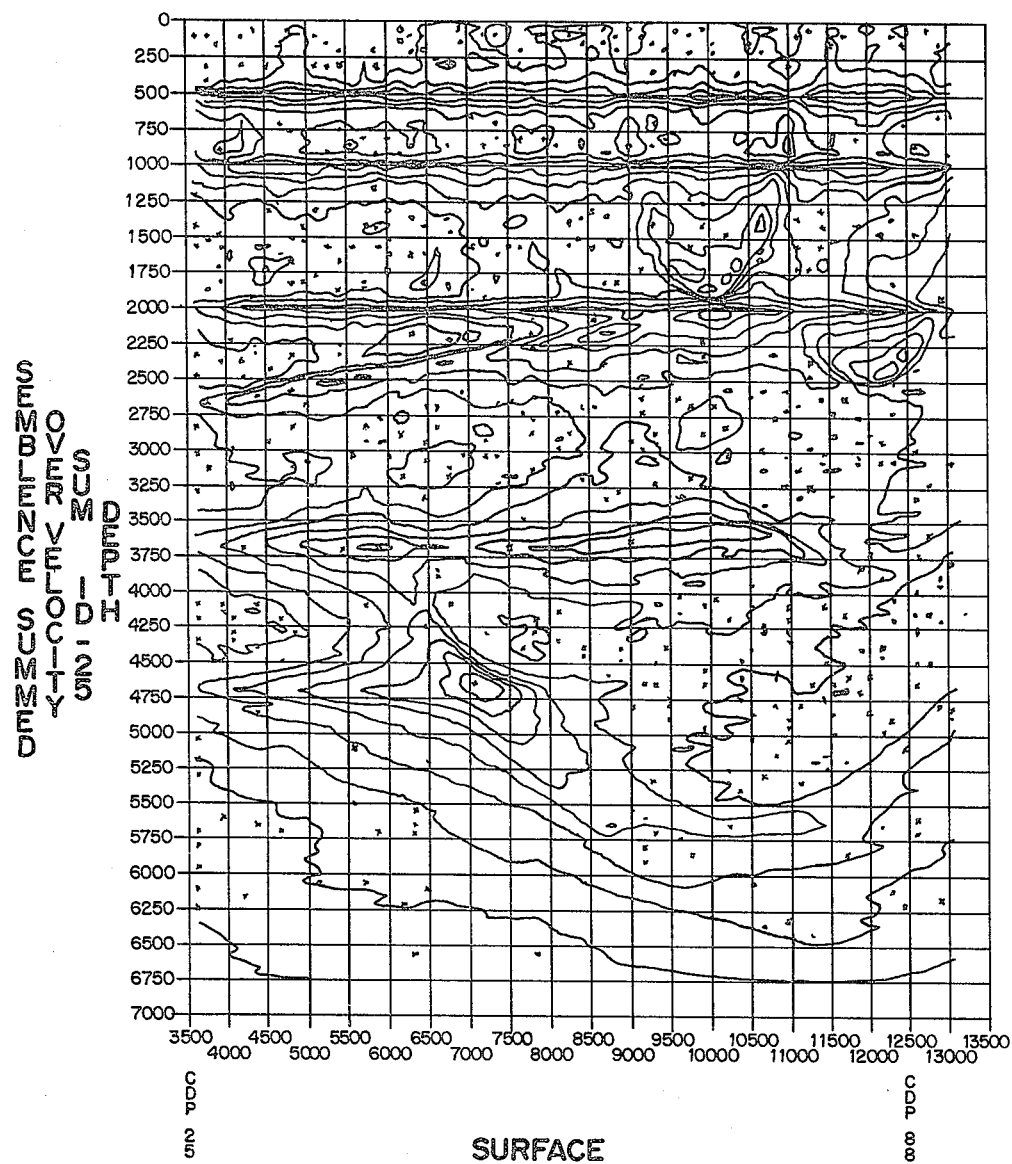
FIG. 7 is a graphical representation of a depth model obtained by summing depth spectra over velocity for FIG. 2.
Figure 8:
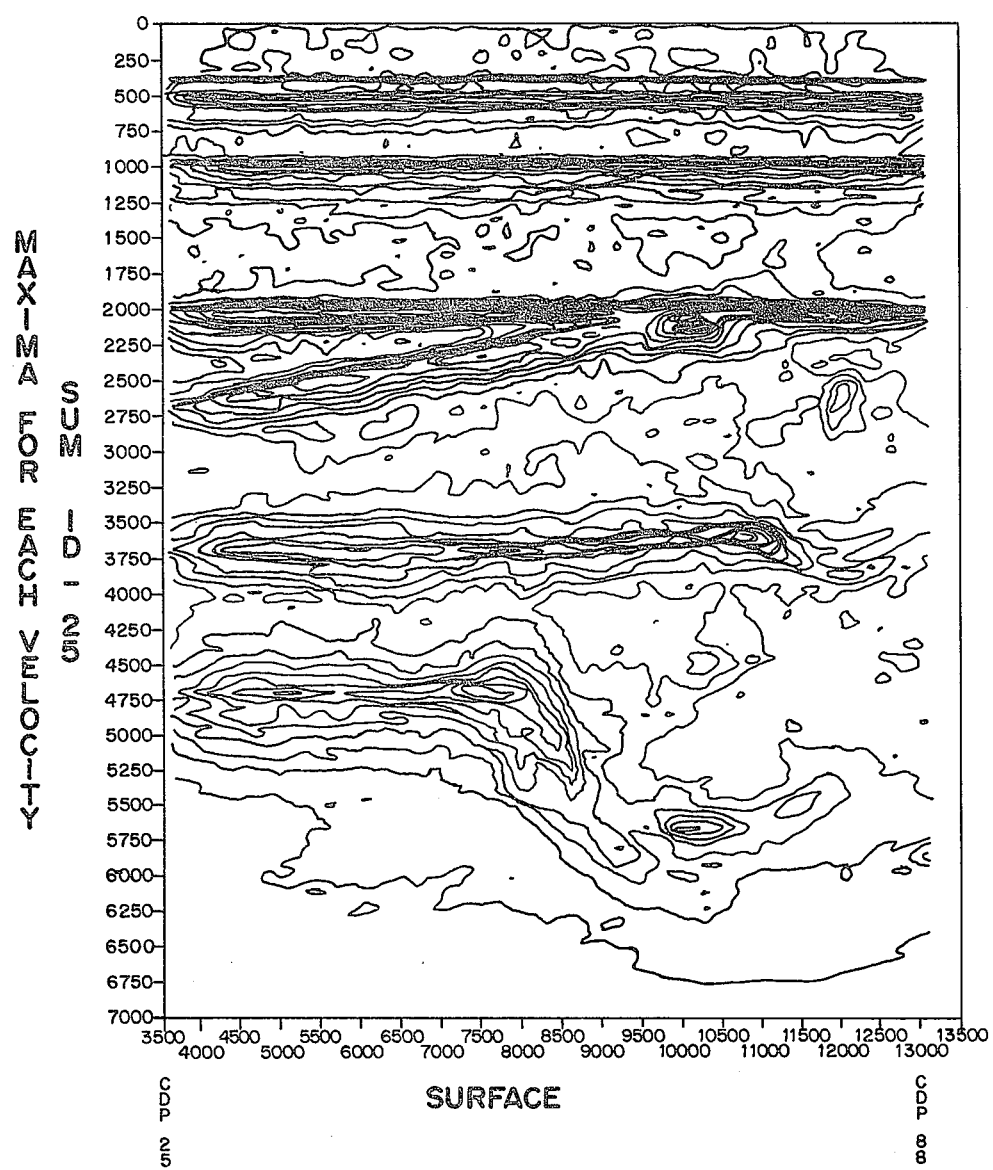
FIG. 8 is a graphical representation of a depth section obtained by contouring the maximum semblance value over velocity.

The FFT migration process was applied after doubling the x and $t_o$ dimensions with zeros to prevent convolutional wraparound. The depth spectra corresponding to the velocity spectra are presented in FIG. 6. FIG. 7 displays the result obtained by summing the depth spectra over velocity and FIG. 8 represents the field obtained by collecting the maxima over velocity. The close agreement with the original depth model (FIG. 2) proves the process is successful on synthetic data sets.

Certain steps in the foregoing process may be replaced, such as replacing the fast Fourier transform by a discrete cosine transform as described in the February, 1980 IEEE transactions on Acoustics, Speed and Signal Processing, without departing from the spirit of the present invention.

While the present invention has been described by way of a preferred embodiment for use in conjunction with a digital computer, it is to be understood that the present invention is not to be limited thereto, but only by the scope of the following claims.

What is claimed is:

1. A method for migrating seismic data comprising the steps of:
   generating acoustic waves into an earth formation from a plurality of spaced sources;
   receiving reflections or refractions of said acoustic waves at a plurality of spaced receivers, thus forming seismic data;
   gathering said seismic data in common depth point gathers;
   producing a velocity spectra for said common depth point gathers;
   using said velocity spectra to generate velocity semblance sections formed as a three dimensional matrix having axes of common depth point (x), zero offset time ($t_o$), and stacking velocity ($V_s$);
   obtaining a frequency domain representation of said velocity semblance sections;
   migrating said frequency domain representation of said velocity semblance sections to produce a representation of a migrated depth section;
   inverse transforming said representation of a migrated depth section to yield a constant velocity depth section having axes of stacking velocity ($V_s$), common depth points (x), and depth (z);
   producing from said constant velocity depth section a two dimensional representation of subsurface formation characteristics as a function of depth (z) and common depth point (x).

2. The method according to claim 1 wherein said step of producing a two dimensional representation includes the steps of:
   producing from said constant velocity depth section a depth spectra for each common depth point; and
   summing maxima of said depth spectra over velocity to obtain said two dimensional representation of subsurface formation characteristics.

3. The method according to claim 1, wherein the step of obtaining a frequency domain representation of said velocity semblance section includes the steps of selecting common depth point (x) and zero offset time ($t_o$) slices for each velocity of said velocity spectra and obtaining a frequency domain representation of said common depth point and zero offset time slices.

4. The method according to claim 3, wherein said frequency domain representation is in the form of a three dimensional matrix having axes of stacking velocity ($V_s$), wave number ($k_x$) which is an analog of common depth point, and an analog (w) of zero offset time and wherein the step of migrating includes the steps of mapping slices of wave number ($k_x$) and the analog of zero offset time (w) for each stacking velocity into slices of wave number ($k_x$) and an analog of depth ($K_z$).

5. The method according to claim 4, wherein said inverse transformation step includes inverse transforming said slices of wave number ($k_x$) and analog of depth ($K_z$).

* * * * *